Jan. 10, 1967  T. L. FAWICK  3,296,832
FLEXIBLE COUPLING
Filed Nov. 3, 1965

INVENTOR.
THOMAS L. FAWICK
BY
Ely, Golrick & Flynn
ATTORNEYS

United States Patent Office 3,296,832
Patented Jan. 10, 1967

3,296,832
FLEXIBLE COUPLING
Thomas L. Fawick, Shaker Heights, Ohio, assignor to Fawick Corporation, a corporation of Michigan
Filed Nov. 3, 1965, Ser. No. 506,182
4 Claims. (Cl. 64—15)

This application is a continuation-in-part of my pending application, Serial No. 390,353, filed August 18, 1964, now abandoned.

This invention relates to a flexible coupling for transmitting torque between two rotatable members, such as two shafts, which are in approximate axial alignment.

A principal object of this invention is to provide a novel and improved flexible coupling in which torque is transmitted between outer and inner rotatable coupling structures through a plurality of transversely disposed, flexible spring elements of novel construction.

Another object of this invention is to provide such a coupling in which the novel spring elements have a substantial extent both radially and longitudinally so as to be flexible circumferentially under load and also flexible transverse to both the longitudinal axis and circumferential extent of the coupling in order to accommodate misalignment of the two rotatable members which are connected to one another by the present coupling.

Another object of this invention is to provide such a coupling having novel provision for retaining the spring elements on the inner coupling structure against radial or axial movement.

Another object of this invention is to provide a novel and improved flexible coupling of rugged and compact construction.

Further objects and advantages of this invention will be apparent from the following detailed description of a presently-preferred embodiment thereof, with reference to the accompanying drawing.

Figures 1, 2, 3:
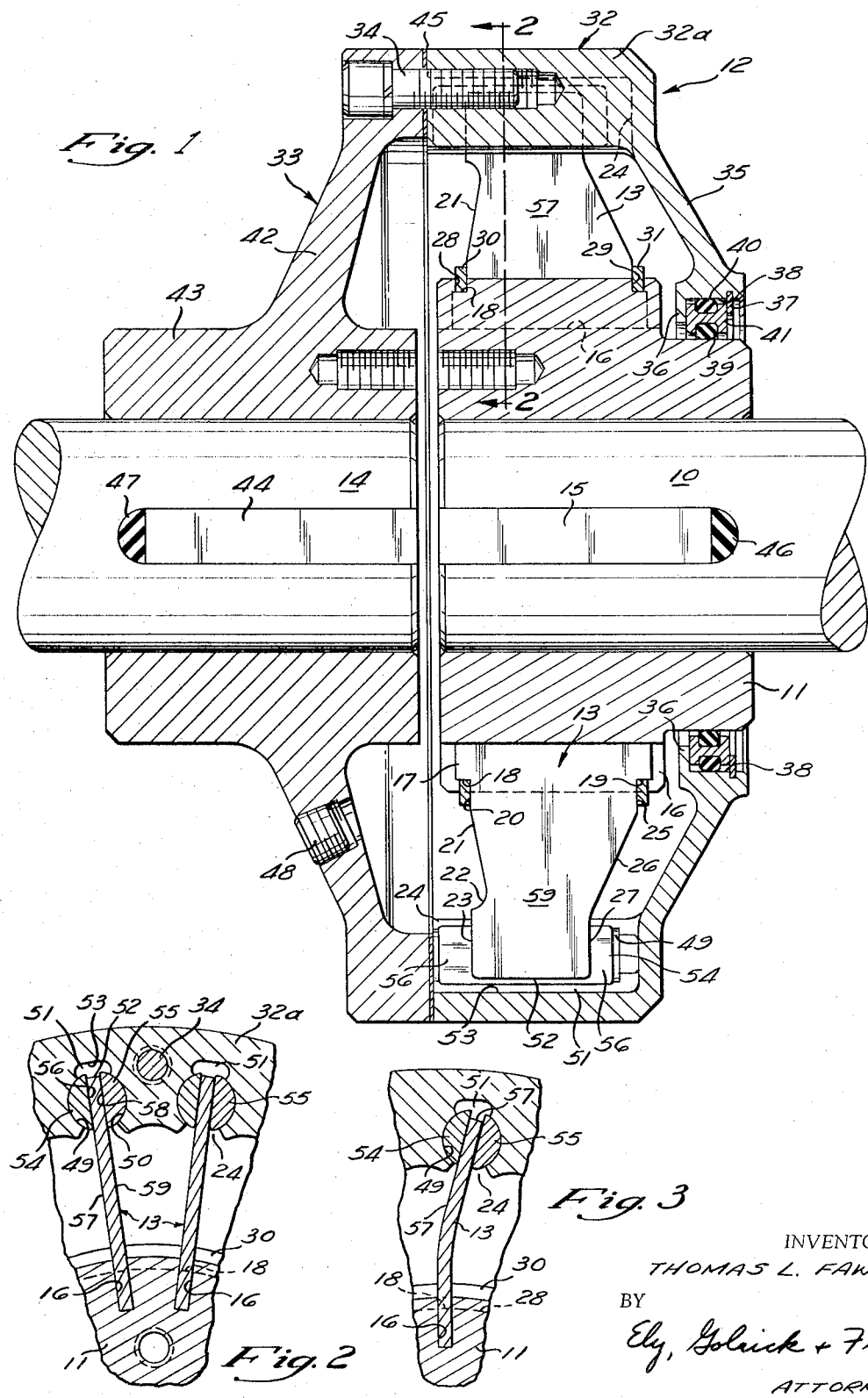
FIGURE 1 is an axial section of a flexible coupling in accordance with the present invention.
FIGURE 2 is a fragmentary cross-section taken along the line 2—2 in FIG. 1 and showing spring plate elements in this coupling under no load.
FIGURE 3 is a view similar to FIG. 2 showing one of the spring plate elements under load in the present coupling.

Referring first to FIG. 1, the flexible coupling shown therein comprises a first rotatable shaft 10, an inner coupling structure 11 carried by shaft 10, an outer coupling structure 12 flexibly and resiliently coupled to the inner structure 11 through a plurality of spring plate elements 13, and a second shaft 14 carrying the outer coupling structure 12 and extending substantially coaxially away from the first shaft 10. In the illustrated embodiment, the spring plate elements 13 are separate, identical, individual, one-piece spring plates.

The inner coupling structure 11 is an annular body coupled to the first shaft 10 by a longitudinal key 15 which rigidly imparts rotation between them. The inner coupling structure 11 is of generally cylindrical cross-section and it has a plurality of identical external recesses or grooves 16 which are evenly spaced apart in succession circumferentially. These grooves 16 extend longitudinally of the body 11, parallel to the conjoint rotational axes of shaft 10 and body 11.

Each of these grooves 16 is open at its opposite axial ends, is of uniform depth throughout its extent, and has a substantially rectangular cross-section. Each groove 16 snugly receives the radially inward end of a respective spring plate 13, with the opposite side walls of the groove abutting against the respective opposite major faces of the plate, as shown in FIGS. 2 and 3. Each of these spring plates preferably is of suitable resilient spring steel and is of substantial extent both radially and longitudinally of the coupling assembly, but thin circumferentially.

The outer coupling structure 12 comprises a pair of rigid annular bodies 32 and 33 connected together by a plurality of bolts 34. Body 32 presents a generally cylindrical outer side wall 32a, formed with a plurality of circumferentially spaced, longitudinal, internal grooves 24, and an inclined end wall 35 which extends toward the right end of the inner coupling structure 11 in FIG. 1. This end wall 35 terminates in a radially inwardly-projecting annular lip 36 and it carries a retaining ring 37 spaced axially from this lip. The lip and ring constitute the opposite axial ends of an annular groove 38 on the end wall which snugly seats inner and outer resilient O-rings 39 and 40 and a rigid annular retainer 41 having inner and outer channels receiving the O-rings. The O-rings sealingly engage the outside of the inner coupling structure 11 and the inside of the end wall 35, respectively.

The body 33 of the outer coupling structure 12 presents an inclined end wall 42 and a generally cylindrical portion 43 which snugly receives shaft 14 and is keyed to the latter at 44. An annular gasket 45 is sealingly engaged between the bodies 32 and 33 of the outer coupling structure. Rubber seals 46 and 47 are provided at the axially outward ends of the respective keys 15 and 44. The inclined end wall 42 of body 33 threadedly receives a plug 48, which may be removed to permit the insertion of oil or other suitable lubricant into the interior of the coupling.

With this arrangement, the outer coupling structure 12 and the various seals provide a liquid-tight enclosure surrounding the inner coupling structure 11 and the adjacent ends of the shafts 10 and 14.

In accordance with the preferred embodiment of this invention, each spring plate element 13 is progressively smaller in longitudinal section in a direction laterally outward from the inner coupling member 11. The purpose of this construction is to provide each spring element with a progressively decreasing resistance to torsional deflection in a laterally outward direction, so as to substantially equalize the torque loading on the spring element throughout substantially its entire lateral extent between the inner and outer coupling structures, thereby avoiding excessive stress concentration at any particular point on the spring element. The torque load will be heaviest closer to the rotational axis of the coupling and therefore the spring element has its maximum longitudinal sectional area at the inner coupling structure 11. The torque load becomes progressively smaller in a direction laterally outward from the inner coupling structure 11, due to the progressively increasing radial distance from the rotational axis, and for this reason each spring element has its longitudinal sectional area progressively reduced toward the outer coupling structure 12.

In the particular embodiment shown in FIG. 1, each spring plate 13 presents an elongated, rectangular inner end portion 17 disposed within the respective external groove 16 in the inner coupling structure 11 and presenting at its opposite axial ends a pair of radially outwardly-facing shoulders 18 and 19 of short axial extent. At its left end in FIG. 1, each spring plate 13 presents a short edge surface 20 extending radially outward from the axially-inward end of shoulder 18 to a location a short distance radially outward beyond the periphery of the inner coupling structure 11. A longer inclined edge surface 21 extends from the outer end of this radial edge surface 20 laterally outward to a location close to the inside periphery of the outer coupling structure 12, where it merges smoothly with a concave edge surface 22 of short extent. This concave surface 22 extends to radial edge surface 23 at the radially outward end of the spring plate, which extends into the respective internal groove 24 in the outer coupling structure 12.

The right end of each spring plate 13 presents a short edge surface 25 which extends radially outward from the axially-inward end of shoulder 19 to a location a short distance radially outward beyond the periphery of the inner coupling structure 11. A longer inclined edge surface 26 extends from the outer end of this radial edge surface 25 laterally outward to the inside periphery of the outer coupling structure 12, where it merges smoothly with a radial edge surface 27 extending into the internal groove 24 in the outer coupling structure.

Each spring plate 13 throughout its entire radial extent has a substantially uniform thickness circumferentially of the coupling in the illustrated embodiment.

The long edge surfaces 21 and 26 on the opposite ends of the spring plate are inclined toward each other radially outward to provide a progressively decreasing length of the spring plate (and therefore a progressively decreasing longitudinal sectional area) throughout substantially its entire radial extent from the inner coupling structure 11 outward to the outer coupling strucure 12, for the purpose explained above.

However, if desired, the progressively reduced longitudinal sectional area of the spring element may be provided by progessively reducing its circumferential thickness, instead of its length, laterally outward from the inner coupling structure 11. Also, *both* the length and the circumferential thickness of the spring elements may be progressively reduced laterally outward, if desired.

The outside of the inner coupling structure 11 is formed with a pair of axially-spaced, circumferential grooves 28 and 29 in which are seated snap rings 30 and 31. The radially outwardly facing shoulder 18 on each spring plate 13 is substantially flush with the radially inward bottom edge of the circumferential groove 28. The adjoining radially extending, axially-outwardly facing edge surface 20 on each spring plate 13 is flush with the axially inward side edge of groove 28. Similarly, the other radially outwardly facing shoulder 19 on each spring plate is substantially flush with the radially inward bottom edge of the corresponding circumferential groove 29, and the adjoining radially extending, axially-outwardly facing edge surface 25 on each spring plate is flush with the axially inward side edge of groove 29. Snap ring 30 snugly engages shoulder 18 and edge surface 20, and snap ring 31 snugly engages shoulder 19 and edge surface 25, on all of the spring plates 13 to prevent axial or radial movement of the spring plates with respect to the inner coupling structure 11.

The previously-mentioned internal grooves 24 in the outer coupling structure 12 at the latter's outer side wall 32a are disposed radially outward from the respective external grooves 16 on the inner coupling structure 11. These grooves 24 are evenly spaced apart circumferentially and each extends longitudinally of the outer coupling structure 12, parallel to the conjoint rotational axes of shaft 10, inner coupling structure 11 and outer coupling structure 12. FIGURE 2 shows in enlarged detail the preferred cross-sectional shape of each of these grooves 24 in the outer coupling structure 12. At the radially inward, open end of this groove, the opposite side walls of the groove present confronting, oppositely curved, cylindrical surfaces 49 and 50 which are coaxial about a center extending parallel to the rotational axis of outer coupling structure 12. Radially outward from these surfaces 49 and 50 the groove 24 is enlarged circumferentially at 51. Normally, i.e., under no load, when the spring plate 13 is disposed longitudinally and radially of the coupling, as shown in FIG. 2, the radially outer edge 52 of each spring plate 13 is spaced substantially radially inward from the radially outwardly disposed bottom wall 53 of the respective groove 24.

A pair of separate, identical bearing members 54 and 55 are rotatably disposed in each groove 24 in the outer coupling structure 12 on opposite sides circumferentially of the respective spring plate 13. These bearing members have cylindrical outside surfaces which have a snug, rolling engagement with the opposite groove surfaces 49 and 50, respectively, as shown in FIG. 2. Preferably, there is a slight clearance, such as ⅛ inch, at the opposite ends of the bearing members 54, 55, as shown in FIG. 1, so that they can slide longitudinally along the groove this limited amount. The bearing member 54 has a flat inside face 56 which has broad area, sliding engagement with one of the flat major faces 57 of the respective spring plate 13 throughout the latter's entire length within the groove 24. The other bearing member 55 has a flat inside face 58 having a similar broad area, sliding engagement with the opposite major face 59 of the same spring plate.

In the operation of this coupling, either shaft 10 or shaft 14 may be the drive shaft and the other the driven shaft. The spring plates 13 constitute a plurality of separate, circumferentially flexible, resilient members for imparting rotation between the outer and inner coupling structures 12 and 11, from one to the other. As shown in FIG. 2, the spring plates 13 are in unobstructed confronting relationship to one another throughout their lateral extent between the inner coupling structure 11 and the outer coupling structure 12. Because of their appreciable radial extent, these spring plates are able to flex a substantial amount circumferentially under load, particularly when the drive shaft is started up, so that torque is transmitted through the coupling to the driven shaft without shock loading. Also, as shown in FIG. 1, each of the spring plates 13 through its lateral extent between the inner and outer coupling structures 11, 12 has an extent longitudinally of the coupling which is not substantially less than its lateral extent. Because the spring plates have this appreciable extent longitudinally of the coupling, they are able to flex about a radial centerline in a direction transverse to the longitudinal axis of the coupling and also transverse to the circumferential extent of the coupling to accommodate misalignment of the respective rotational axes of the drive shaft and the driven shaft without significantly impairing the operation of the coupling.

When the spring plates flex under load, as shown in FIG. 3, their outer ends can slide over the flat inside faces of the respective bearing members 54, 55 in the internal grooves 24 on the outer coupling structure 12 while their radially inward ends remain seated tightly, both radially and axially, on the inner coupling structure 11. Also, as shown in FIG. 3, under load these bearing members 54, 55 can turn independent of one another in the respective groove in response to such movement of the spring plate. Because the two bearing members are separate and disconnected from each other, they can both turn and slide longitudinally independent of one another to accommodate the movement of the respective spring plate and there is no chance of binding between the spring plate and either bearing member. The bearing members 54, 55 may be of bronze, which may be extruded as a long piece of any desired length having the cross-section shown and then cut into short lengths to provide these bearing members. Alternatively, the bearing members may be of suitable hard wood, such as maple, which is then oil-soaked for lubrication purposes.

In the operation of the coupling the oil inside the coupling will be thrown out by centrifugal force into the internal grooves 24 in the outer coupling structure 12 to provide proper lubrication at the bearing members 54, 55. The sliding of the spring plates across the inside faces of these bearing members insures that oil will be continuously worked across their sliding faces for effective lubrication.

Since the several spring plates 13 are identical and are symmetrically positioned circumferentially of the coupling, they share the torque substantially equally and no single one of them is subjected to excessive stress. Even in the event of breakage of one or more of the spring plates 13, the others can assume increased individual torque loads without excessive stress on any particular one. The tapered construction of each spring plate, with the longitudinal sectional area being progressively smaller in a direction radially outward from the axis of the coupling, enables the torque load to be substantially evenly distributed across the radial extent of the spring plate. That is, where the torque is greatest, toward the radially inward side of the plate, it has a greater longitudinal sectional area so that the load per increment of area is substantially the same there as at the radially outward side of the plate, where the torque is lower because of the greater radial distance from the axis of rotation of the coupling. Consequently, there is no excessive stress concentration on any part of the spring plate.

The snap rings 30 and 31 positively locate the spring plates 13 both axially and radially on the inner coupling structure 11. They restrain the spring plates against movement radially outward due to centrifugal force as body 11 rotates.

While presently-preferred embodiments of this invention have been described in detail with reference to the accompanying drawing, it is to be understood that various structural modifications, omissions and refinements which depart from the disclosed embodiments may be adopted without departing from the spirit and scope of this invention. For example, each spring element 13 may be composed of a plurality of separate, thin plate members arranged face to face. Also, if desired, the respective spring elements may have their respective lengths disposed at an angle to the longitudinal rotational axis of the coupling, rather than parallel to that axis, and/or the respective spring elements may extend transversely outward from the inner coupling member other than radially with respect to the longitudinal rotational axis of the coupling. Also, if appreciable axial misalignment of the drive shaft and the driven shaft is expected, a greater minimum radial clearance may be provided between the outer and inner rotatable structures of the coupling, so as to accommodate such misalignment.

I claim:

1. A flexible coupling comprising a rotatable outer coupling structure, a rotatable inner coupling structure spaced radially inward from said outer coupling structure, and a plurality of torsionally flexible spring plates anchored to said inner coupling structure at circumferentially spaced locations thereon and extending laterally outward from the latter into torque-transmitting sliding engagement with said outer coupling structure, said spring plates being circumferentially spaced from one another and in unobstructed confronting relationship to one another throughout their lateral extent between said inner and outer coupling structures, said spring plates laterally outward from said inner coupling structure being progressively smaller in longitudinal section and presenting a progressively decreasing resistance to torsional flexing in a laterally outward direction for substantial equalization of the torque loading on the spring plate across its lateral extent between said inner and outer coupling structures, each of said spring plates having a substantial extent laterally between said inner and outer coupling structures and throughout said lateral extent having an extent longitudinally of the coupling which is not substantially less than said lateral extent and being thin circumferentially, each said spring plate being substantially flexible both circumferentially and transverse to both the length and the circumferential extent of the coupling.

2. A flexible coupling according to claim 1 wherein said spring plates constitute the sole means connecting said outer and inner coupling structures to one another in torque-transmitting relationship for imparting rotation from one of said coupling structures to the other.

3. A flexible coupling according to claim 2, wherein said inner coupling structure has a plurality of circumferentially spaced, external, longitudinal grooves which receive the radially inward ends of the respective spring plates, said inner coupling structure has a pair of axially spaced, external, circumferential grooves intersecting said longitudinal grooves, each spring plate has a pair of axially spaced, radially outwardly facing shoulders substantially flush with the radially inward bottom edges of said circumferential grooves and a pair of axially outwardly facing edges substantially flush with the axially inward side edges of said circumferential grooves, and wherein there are provided a pair of snap rings engaged in said circumferential grooves and abutting against said shoulders and said axially facing edges on the spring plates to retain the latter radially and axially on said inner coupling structure.

4. A flexible coupling comprising a rotatable outer coupling structure, a rotatable inner coupling structure spaced radially inward from said outer coupling structure, a plurality of torsionally flexible spring plates anchored to said inner coupling structure at circumferentially spaced locations thereon and extending laterally outward therefrom into torque-transmitting sliding engagement with said outer coupling structure, said spring plates having a substantial extent both laterally between said inner and outer coupling structures and longitudinally of the coupling and being thin circumferentially, said spring plates being substantially flexible both circumferentially and transverse to both the length and the circumferential extent of the coupling, said inner coupling structure having a plurality of circumferentially spaced, external, longitudinal grooves which receive the radially inward ends of the respective spring plates, said inner coupling structure having a pair of axially spaced, external, circumferential grooves intersecting said longitudinal grooves, each spring plate having a pair of axially spaced, radially outwardly facing shoulders substantially flush with the radially inward bottom edges of said circumferential grooves and a pair of axially outwardly facing edges substantially flush with the axially inward side edges of said circumferential grooves, and a pair of snap rings engaged in said circumferential grooves and abutting against said shoulders and said axially facing edges on the spring plates to retain the latter radially and axially on said inner coupling structure.

References Cited by the Examiner

UNITED STATES PATENTS

| 729,649 | 6/1903 | Nyberg | 64—27 X |
| 1,332,962 | 3/1920 | Tibbetts | 64—15 |
| 1,622,101 | 3/1927 | Francke | 64—15 |
| 1,853,757 | 4/1932 | Behrens | 64—15 |

FOREIGN PATENTS

| 556,363 | 4/1923 | France. |
| 508,425 | 6/1939 | Great Britain. |

OTHER REFERENCES

Lohmeyer: German application No. 1,109,465, published June 22, 1961.

FRED C. MATTERN, JR., *Primary Examiner.*

HALL C. COE, *Examiner.*